*(12)* United States Patent
Balk et al.

(10) Patent No.: US 9,150,732 B2
(45) Date of Patent: Oct. 6, 2015

(54) AQUEOUS EMULSION POLYMERS, THEIR PREPARATION AND USE

(71) Applicant: BASF SE, Ludwigshafen (DE)

(72) Inventors: Roelof Balk, Boehl-Iggelheim (DE); Rolf Dersch, Neustadt (DE); Sebastian Roller, Mannheim (DE); Bernhard Schuler, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/134,481

(22) Filed: Dec. 19, 2013

(65) Prior Publication Data

US 2014/0107249 A1    Apr. 17, 2014

Related U.S. Application Data

(63) Continuation of application No. 13/221,021, filed on Aug. 30, 2011, now Pat. No. 8,722,756.

(60) Provisional application No. 61/378,970, filed on Sep. 1, 2010.

(51) Int. Cl.
| | |
|---|---|
| *C08F 290/14* | (2006.01) |
| *B29C 71/04* | (2006.01) |
| *A61L 2/08* | (2006.01) |
| *A61L 24/00* | (2006.01) |
| *C08F 2/46* | (2006.01) |
| *C08G 61/04* | (2006.01) |
| *C09D 5/02* | (2006.01) |
| *C08F 2/24* | (2006.01) |
| *C09D 4/00* | (2006.01) |
| *C08F 220/18* | (2006.01) |
| *C09D 133/06* | (2006.01) |
| *C08F 220/40* | (2006.01) |

(52) U.S. Cl.
CPC . *C09D 5/022* (2013.01); *C08F 2/24* (2013.01); *C08F 2/46* (2013.01); *C08F 220/18* (2013.01); *C09D 4/00* (2013.01); *C09D 133/066* (2013.01); *C08F 220/40* (2013.01); *C08F 2220/1825* (2013.01)

(58) Field of Classification Search
CPC ........ C08F 2/24; C08F 220/18; C08F 220/40; C08F 2220/1825; C08F 220/06; C08F 2220/283; C08F 212/08; C09D 4/00
USPC ................. 522/84, 83, 71, 189, 184, 1; 520/1
See application file for complete search history.

(56) References Cited

U.S. PATENT DOCUMENTS

| | | | |
|---|---|---|---|
| 3,320,198 A | 5/1967 | Hill et al. | |
| 4,269,749 A | 5/1981 | Marriott et al. | |
| 4,733,005 A | 3/1988 | Schmidt et al. | |
| 5,066,520 A | 11/1991 | Freiberg et al. | |
| 5,162,415 A | 11/1992 | Rehmer et al. | |
| 5,168,087 A * | 12/1992 | Li Bassi et al. | 502/164 |
| 5,750,751 A | 5/1998 | Saam | |
| 5,824,716 A | 10/1998 | Coqueret et al. | |
| 7,691,942 B2 * | 4/2010 | Bardman et al. | 524/804 |
| 2008/0146724 A1 * | 6/2008 | Bohling et al. | 524/500 |
| 2009/0143540 A1 * | 6/2009 | Ghosh et al. | 525/417 |
| 2010/0261840 A1 * | 10/2010 | Breiner et al. | 524/832 |
| 2011/0318595 A1 | 12/2011 | Breiner et al. | |

FOREIGN PATENT DOCUMENTS

| | | |
|---|---|---|
| DE | 25 13 516 | 2/1976 |
| DE | 26 38 544 | 6/1977 |
| DE | 40 03 422 A1 | 8/1991 |
| DE | 05222 789 | 1/1992 |
| DE | 41 05 134 C1 | 10/1992 |
| DE | 196 24 299 A1 | 1/1997 |
| DE | 196 09 509 A1 | 9/1997 |
| DE | 196 21 027 A1 | 11/1997 |
| DE | 197 41 184 A1 | 3/1999 |
| DE | 197 41 187 A1 | 3/1999 |
| DE | 198 05 122 A1 | 4/1999 |
| DE | 198 28 183 A1 | 12/1999 |
| DE | 198 39 199 A1 | 3/2000 |
| DE | 198 40 586 A1 | 3/2000 |
| DE | 198 47 115 C1 | 5/2000 |
| DE | 102009001966 | 10/2007 |
| EP | 0 010 000 A1 | 4/1980 |
| EP | 0 417 568 A2 | 3/1991 |
| EP | 0 522 789 * | 1/1993 |
| EP | 0 522 789 A2 | 1/1993 |
| EP | 0 710 680 A2 | 5/1996 |
| EP | 0 690 882 B1 | 1/1998 |
| EP | 0 771 328 B1 | 10/1998 |
| EP | 0 890 621 A2 | 1/1999 |
| EP | 1 125 949 A1 | 8/2001 |
| EP | 1 294 816 B1 | 1/2006 |
| EP | 1 614 732 A2 | 1/2006 |
| EP | 1 147 139 B1 | 9/2006 |
| EP | 1 845 142 A1 | 10/2007 |
| WO | 92/14763 A1 | 9/1992 |
| WO | 95/20016 A1 | 7/1995 |
| WO | 99/25780 | 5/1999 |
| WO | 03/029300 A1 | 4/2003 |
| WO | 2009/047234 A2 | 4/2009 |
| WO | 2009/146995 A1 | 12/2009 |
| WO | 2010/112474 A1 | 10/2010 |

OTHER PUBLICATIONS

B. George Bufkin, et al., "Survey of the Applications, Properties, and Technology of Crosslinking Emulsions Part III", Journal of Coatings Technology, vol. 50, No. 644, Sep. 1978, pp. 83-109.
International Search Report issued Nov. 9, 2011 in PCT/EP2011/064938.

* cited by examiner

*Primary Examiner* — Ling Choi
*Assistant Examiner* — Jessica E Whiteley
(74) *Attorney, Agent, or Firm* — Oblon, McClelland, Maier & Neustadt, L.L.P.

(57) ABSTRACT

The present invention provides aqueous emulsion polymers comprising
  (A) monomers A
  (B) at least one (meth)acrylate with olefinically unsaturated side groups (monomers B), and
  (C) at least one photoinitiator, and also the use thereof in coating materials, more particularly in exterior architectural paints.

16 Claims, No Drawings

AQUEOUS EMULSION POLYMERS, THEIR PREPARATION AND USE

CROSS REFERENCE TO RELATED APPLICATION

This application is a continuation of U.S. application Ser. No. 13/221,021, filed on Aug. 30, 2011, which claims the benefit of priority of U.S. Provisional Application No. 61/378,970, filed on Sep. 1, 2010.

DESCRIPTION

The present invention provides aqueous emulsion polymers comprising
- (A) monomers A
- (B) at least one (meth)acrylate with olefinically unsaturated side groups (monomers B), and
- (C) at least one photoinitiator.

The present invention likewise provides coating materials comprising the polymer dispersions of the invention, and also their preparation and use, more particularly in exterior architectural paints. The coating materials may either be free from organic solvents or comprise organic solvents. Another embodiment of the invention are coating materials which comprise as binders polymer dispersions of the invention having glass transition temperatures <0° C., for elastic, crack-bridging coatings. Coatings based on the above-described coating materials are notable for improved soil pickup resistance.

Coatings outdoors, as for example on the outsides of buildings, are exposed to wind and weather, and, over time, pick up particles of soil from the environment. Soiled coatings of this kind are indeed still capable of protecting the substrate, whether plaster or masonry, from effects of weathering. Frequently, however, exterior architectural coatings are renovated because soiling has rendered them gray and unattractive. This results in increased costs for maintenance.

Whether a coating outdoors becomes soiled quickly or slowly is dependent on a multiplicity of factors, such as, firstly, on air pollution, climatic conditions, and so on, but also, secondly, on the roughness of the coating and on the interaction between soil particles and the coating's surface. One important parameter in this context is the hardness of the binder polymer. Binders which dry to form soft or even tacky films pick up soil more quickly than those with a hard surface. The problem of soiling is therefore apparent particularly with coating materials which comprise soft binder polymers, which are those solvent-free coating materials, for example, whose binders still coalesce at processing temperatures down to a little above 0° C., to form a film, and coating materials for elastic coatings. Elastic coatings are characterized by a high degree of elasticity. This quality is utilized to give the elastic coatings sufficient crack-bridging capacity even at low temperatures (−10° C.). The glass transition temperature of the polymer is normally adjusted by way of the monomer composition to temperatures below −10° C. Polymers with a low glass transition temperature have an increased propensity toward soil pickup. This can be prevented using crosslinking systems which make the polymer more elastic and possibly harder (glass transition temperature is raised). State of the art, for example, is metal salt crosslinking or UV crosslinking. The subsequent addition of calcium ions results in crosslinking, as described by B. G. Bufkin and J. R. Grawe in J. Coatings Tech., 1978 50(644), 83. One possible disadvantage might be increased sensitivity to water. UV crosslinking and/or daylight crosslinking is achieved through addition of benzophenone and/or its derivatives, as described in U.S. Pat. No. 3,320,198, EP 100 00, EP 522 789, and EP 1 147 139. EP 1 845 142 describes the addition of a photoinitiator to AAEM-containing dispersions.

Other ways of achieving high elasticity and good water vapor permeability include the use of silicones, as described in U.S. Pat. No. 5,066,520, for example. The use of fluoroacrylates results in very hydrophobic coatings which may likewise repel soil (EP 890 621).

It was an object of the present invention to develop an aqueuos dispersion which is suitable as a binder in coating compositions, more particularly in elastic coating compositions, and which in the coating ensures sufficient elasticity and water resistance in tandem with high soil pickup resistance and water vapor permeability.

Surprisingly, aqueous emulsion polymers comprising
- (A) monomers A,
- (B) at least one (meth)acrylate with olefinically unsaturated side groups (monomers B), and
- (C) at least one photoinitiator (component C)

as binders are notable for high dirt pickup resistance without substantially affecting film extension overall.

Unless indicated otherwise, the following general definitions apply in the context of the present invention:

$C_1$-$C_4$ alkyl is a linear or branched alkyl radical having 1 to 4 carbon atoms. This is methyl, ethyl, n-propyl, isopropyl, n-butyl, sec-butyl, isobutyl, and tert-butyl.

$C_1$-$C_{18}$ alkyl is a linear or branched alkyl radical having 1 to 12 carbon atoms. Examples thereof are methyl, ethyl, n-propyl, isopropyl, n-butyl, sec-butyl, isobutyl, tert-butyl, pentyl, neopentyl, hexyl, heptyl, octyl, 2-ethylhexyl, nonyl, decyl, 2-propylheptyl, 4-methyl-2-propylhexyl, undecyl, dodecyl, and their constitutional isomers.

Aryl is a carbocylic aromatic radical having 6 to 14 carbon atoms, such as phenyl, naphthyl, anthracenyl or phenanthrenyl. Aryl preferably is phenyl or naphthyl and more particularly is phenyl.

$C_1$-$C_{18}$ alkylaryl is $C_1$-$C_{18}$ alkyl as defined above where one hydrogen atom has been replaced by an aryl group. Examples are benzyl, phenethyl, and the like.

A primary amino group is understood to be a radical —$NH_2$.

The observations below concerning preferred embodiments of the process of the invention, more particularly concerning the monomers and other reaction components used in accordance with the invention, and concerning the polymers obtainable by the process and also concerning their use, apply not only on their own, taken per se, but also, in particular, in any conceivable combination with one another.

Aqueous emulsion polymers are familiar to the skilled person and are prepared, for example, in the form of an aqueous polymer dispersion by free-radically initiated aqueous emulsion polymerization of ethylenically unsaturated monomers. This method has been widely described before now and is therefore sufficiently well known to the skilled person [cf., e.g., Encyclopedia of Polymer Science and Engineering, vol. 8, pages 659 to 677, John Wiley & Sons, Inc., 1987; D. C. Blackley, Emulsion Polymerisation, pages 155 to 465, Applied Science Publishers, Ltd., Essex, 1975; D. C. Blackley, Polymer Latices, 2nd Edition, vol. 1, pages 33 to 415, Chapman & Hall, 1997; H. Warson, The Applications of Synthetic Resin Emulsions, pages 49 to 244, Ernest Benn, Ltd., London, 1972; J. Piirma, Emulsion Polymerisation, pages 1 to 287, Academic Press, 1982; F. Hölscher, Dispersionen synthetischer Hochpolymerer, pages 1 to 160, Springer-Verlag, Berlin, 1969, and patent specification DE-A 40 03 422]. The free-radically initiated aqueous emulsion polymerization is typically accomplished by dispersing the ethylenically unsaturated monomers in the aqueous medium, generally using dispersing assistants, such as emulsifiers and/or protective colloids, and polymerizing them by means of at least one water-soluble free-radical polymerization initiator. Frequently, in the aqueous polymer dispersions obtained, the residual amounts of unreacted ethylenically unsaturated monomers are lowered by chemical and/or physical methods that are likewise known to the skilled person [see, for example, EP-A 771328, DE-A 19624299, DE-A 19621027, DE-A 19741184, DE-A 19741187, DE-A 19805122, DE-A 19828183, DE-A 19839199, DE-A 19840586 and 19847115], the polymer solids content is adjusted to a desired level by dilution or concentration, or other customary additives, such as bactericidal, foam-modifying or viscosity-modifying additives, are added to the aqueous polymer dispersion.

In addition to these so-called primary aqueous polymer dispersions, the skilled person is also aware of so-called secondary aqueous polymer dispersions. By these are meant those aqueous polymer dispersions in whose preparation the polymer is produced outside of the aqueous dispersion medium, being located, for example, in solution in a suitable nonaqueous solvent. This solution is then transferred into the aqueous dispersion medium, and the solvent is separated off, generally by distillation, while dispersion takes place.

Preferably, though, it is preferred for primary aqueous dispersions to be used.

In accordance with the invention, for the purposes of the present process, dispersants are used which maintain not only the monomer droplets but also the resultant polymer particles in disperse distribution in the aqueous medium and so ensure the stability of the aqueous polymer dispersion produced. Suitable dispersants include not only the protective colloids typically used to implement free-radical aqueous emulsion polymerizations, but also emulsifiers.

Examples of suitable protective colloids include polyvinyl alcohols, polyalkylene glycols, alkali metal salts of polyacrylic acids and polymethacrylic acids, gelatin derivatives or copolymers comprising acrylic acid, methacrylic acid, maleic anhydride, 2-acrylamido-2-methylpropanesulfonic acid and/or 4-styrenesulfonic acid, and the alkali metal salts of such copolymers, and also homopolymers and copolymers comprising N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-bearing acrylates, methacrylates, acrylamides and/or methacrylamides. An exhaustive description of further suitable protective colloids is found in Houben-Weyl, Methoden der organischen Chemie, volume XIV/1, Makromolekulare Stoffe [Macromolecular Compounds], Georg-Thieme-Verlag, Stuttgart, 1961, pages 411 to 420.

It will be appreciated that mixtures of protective colloids and/or emulsifiers as well can be used. They may be anionic, cationic or nonionic in nature. It will be appreciated that, when using mixtures of surface-active substances, the individual components must be compatible with one another, something which in case of doubt can be ascertained by means of a few preliminary tests. Generally speaking, anionic emulsifiers are compatible with one another and with non-ionic emulsifiers. The same is true of cationic emulsifiers, whereas anionic and cationic emulsifiers are usually not compatible with one another. An overview of suitable emulsifiers is found in Houben-Weyl, Methoden der organischen Chemie, volume XIV/1, Makromolekulare Stoffe [Macromolecular Compounds], Georg-Thieme-Verlag, Stuttgart, 1961, pages 192 to 208.

Preferably, however, emulsifiers exclusively are used as dispersants in accordance with the invention.

Customary nonionic emulsifiers are, for example, ethoxylated mono-, di-, and tri-alkylphenols (EO degree: 3 to 50, alkyl radical: $C_4$ to $C_{12}$) and also ethoxylated fatty alcohols (EO degree: 3 to 80; alkyl radical: $C_8$ to $C_{36}$). Examples thereof are the Lutensol® A grades ($C_{12}C_{14}$ fatty alcohol ethoxylates, EO degree: 3 to 8), Lutensol® AO grades ($C_{13}C_{15}$ is oxo alcohol ethoxylates, EO degree: 3 to 30), Lutensol® AT grades ($C_{16}C_{18}$ fatty alcohol ethoxylates, EO degree: 11 to 80), Lutensol® ON grades ($C_{10}$ oxo alcohol ethoxylates, EO degree 3 to 11), and Lutensol® TO grades ($C_{13}$ oxo alcohol ethoxylates, EO degree: 3 to 20), all from BASF SE.

Typical anionic emulsifiers are, for example, alkali metal salts and ammonium salts of alkyl sulfates (alkyl radical: $C_8$ to $C_{12}$), of sulfuric monoesters with ethoxylated alkanols (EO degree: 4 to 30, alkyl radical: $C_{12}$ to $C_{18}$) and ethoxylated alkylphenols (EO degree: 3 to 50, alkyl radical: $C_4$ to $C_{12}$), of alkylsulfonic acids (alkyl radical: $C_{12}$ to $C_{18}$), and of alkylarylsulfonic acids (alkyl radical: $C_9$ to $C_{18}$).

Compounds which have proven suitable as further anionic emulsifiers are, additionally, compounds of the general formula (I)

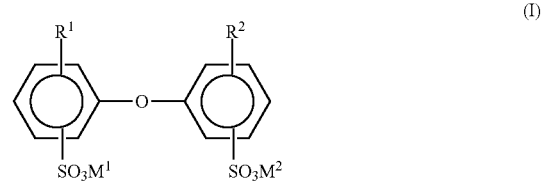

in which $R^1$ and $R^2$ are hydrogen atoms or $C_4$ to $C_{24}$ alkyl but are not simultaneously hydrogen atoms, and $M^1$ and $M^2$ can be alkali metal ions and/or ammonium ions. In the general formula (I) $R^1$ and $R^2$ are preferably linear or branched alkyl radicals having 6 to 18 carbon atoms, in particular having 6, 12, and 16 carbon atoms, or hydrogen, but $R^1$ and $R^2$ are not both simultaneously hydrogen atoms. $M^1$ and $M^2$ are preferably sodium, potassium or ammonium, particular preference being given to sodium. Particularly advantageous compounds (I) are those in which $M^1$ and $M^2$ are sodium, $R^1$ is a branched alkyl radical of 12 carbon atoms and, $R^2$ is a hydrogen atom or $R^1$. Frequently use is made of technical mixtures containing a fraction of 50% to 90% by weight of the monoalkylated product, an example being Dowfax® 2A1 (brand of the Dow Chemical Company). The compounds (I) are common knowledge, from U.S. Pat. No. 4,269,749 for example, and are available commercially.

Suitable cation-active emulsifiers are generally $C_6$ to $C_{18}$ alkyl-, $C_6$ to $C_{18}$ alkylaryl- or heterocyclyl-containing primary, secondary, tertiary or quaternary ammonium salts, alkanolammonium salts, pyridinium salts, imidazolinium salts, oxazolinium salts, morpholinium salts, thiazolinium salts, and salts of amine oxides, quinolinium salts, isoquinolinium salts, tropylium salts, sulfonium salts and phosphonium salts. Examples that may be mentioned include dodecylammonium acetate or the corresponding sulfate, the sulfates or acetates of the various paraffinic acid 2-(N,N,N-trimethylammonio)ethyl esters, N-cetylpyridinium sulfate, N-laurylpyridinium sulfate, and N-cetyl-N,N,N-trimethylammonium sulfate, N-dodecyl-N,N,N-trimethylammonium sulfate, N-octyl-N,N,N-trimethlyammonium sulfate, N,N-distearyl-N,N-dimethylammonium sulfate, and the Gemini surfactant N,N'-(lauryldimethyl)ethylenediamine disulfate, ethoxylated tallowalkyl-N-methylammonium sulfate and ethoxylated oleylamine (for example Uniperol® AC from BASF SE, about 12 ethylene oxide units). Numerous further examples are found in H. Stache, Tensid-Taschenbuch, Carl-Hanser-Verlag, Munich, Vienna, 1981 and in McCutcheon's, Emulsifiers & Detergents, MC Publishing Company, Glen Rock, 1989. It is advantageous if the anionic counter-groups are, as far as possible, of low nucleophilicity, such as, for example, perchlorate, sulfate, phosphate, nitrate, and carboxylates, such as acetate, trifluoroacetate, trichloroacetate, propionate, oxalate, citrate, and benzoate, and also conjugated anions of organic sulfonic acids, such as methylsulfonate, trifluoromethylsulfonate, and para-toluenesulfonate, and additionally tetrafluoroborate, tetraphenylborate, tetrakis (pentafluorophenyl)borate, tetrakis[bis(3,5-trifluoromethyl) phenyl]borate, hexafluorophosphate, hexafluoroarsenate or hexafluoroantimonate.

The emulsifiers used with preference as dispersants are employed advantageously in a total amount ≥0.1% and ≤10%, preferably ≥0.1% and ≤5%, in particular ≥0.5% and ≤4%, by weight, based in each case on the total monomer amount.

The total amount of protective colloids used as dispersants, additionally to or in lieu of the emulsifiers, is often ≥0.1% and ≤10% and frequently ≥0.2% and ≤7%, by weight, based in each case on the total monomer amount.

It is preferred, however, to use anionic and/or nonionic emulsifiers as dispersants.

If the particle size of the polymer particles to be prepared by means of the free-radically initiated aqueous emulsion polymerization is to be set in a targeted way, the approach then generally taken is to use what is called a polymer seed, which either has been prepared beforehand with other monomers, separately (exogenous polymer seed), or has been prepared in situ by partial polymerization of the monomers to be polymerized.

Preparing an aqueous polymer dispersion using an in situ polymer seed is familiar to the skilled person (see, for example, DE-A 19609509, EP-A 690882, EP-A 710680, EP-A 1125949, EP-A 1294816, EP-A 1614732, WO-A 03/29300) and takes place generally, prior to the actual emulsion polymerization, a small portion of the monomer mixture used for the emulsion polymerization is introduced as an initial charge in the aqueous polymerization medium and is free-radically polymerized in the presence of a large amount of emulsifier.

The particle size of the emulsion polymers of the invention is set preferably with the aid of an exogenous polymer seed.

The free-radically initiated aqueous emulsion polymerization is started off by means of a free-radical polymerization initiator. Initiators may in principle include both peroxides and azo compounds. It will be appreciated that redox initiator systems as well are suitable. Peroxides used may in principle be inorganic peroxides, such as hydrogen peroxide or peroxodisulfates, such as the mono- or di-alkali metal or -ammonium salts of peroxodisulfuric acid, such as their mono- and di-sodium, -potassium or -ammonium salts, for example, or organic peroxides, such as alkyl hydroperoxides, examples being tert-butyl, p-menthyl, and cumyl hydroperoxide, and also dialkyl or diaryl peroxides, such as di-tert-butyl peroxide or dicumyl peroxide. As an azo compound use is made substantially of 2,2"-azobis(isobutyronitrile), 2,2"-azobis(2,4-dimethylvaleronitrile), and 2,2"-azobis(amidinopropyl)dihydrochloride (AIBA, corresponding to V-50 from Wako Chemicals). Suitable oxidizing agents for redox initiator systems include substantially the aforementioned peroxides. As corresponding reducing agents it is possible to use sulfur compounds with a low oxidation state, such as alkali metal sulfites, examples being potassium and/or sodium sulfite, alkali metal hydrogensulfites, examples being potassium and/or sodium hydrogensulfite, alkali metal metabisulfites, examples being potassium and/or sodium metabisulfite, formaldehyde-sulfoxylates, examples being potassium and/or sodium formaldehyde-sulfoxylate, alkali metal salts, especially potassium salts and/or sodium salts, aliphatic sulfinic acids, and alkali metal hydrogensulfides, such as potassium and/or sodium hydrogensulfide, salts of polyvalent metals, such as iron(II) sulfate, iron(II) ammonium sulfate, iron(II) phosphate, endiols, such as dihydroxymaleic acid, benzoin and/or ascorbic acid, and reducing saccharides, such as sorbose, glucose, fructose and/or dihydroxyacetone. In general the amount of free-radical initiator used, based on the total monomer amount, is 0.01% to 5%, preferably 0.1% to 3%, and more preferably 0.2% to 1.5% by weight.

The total amount of the free-radical initiator can be included in the initial charge in the aqueous polymerization medium before the polymerization reaction is initiated. It is also possible, however, optionally to include only a portion of the free-radical initiator in the initial charge in the aqueous polymerization medium before the polymerization reaction is initiated, and then, under polymerization conditions, during the free-radical emulsion polymerization of the invention, to add the entirety or, if applicable, any remainder in accordance with the rate of its consumption, such addition taking place discontinuously in one or more portions or continuously with constant or varying flow rates.

By initiation of the polymerization reaction is meant the start of the polymerization reaction of the monomers present in the aqueous polymerization medium, following formation of free radicals by the free-radical initiator. The polymerization reaction may be initiated by addition of free-radical initiator to the aqueous polymerization medium in the polymerization vessel under polymerization conditions. It is also possible, however, for a portion or the entirety of the free-radical initiator to be added to the aqueous polymerization medium in the polymerization vessel, optionally comprising monomers A and B included in the initial charge, under conditions which are not suitable for triggering a polymerization reaction, such as at low temperature, for example, and thereafter to bring about polymerization conditions in the aqueous polymerization medium. By polymerization conditions are meant, generally speaking, those temperatures and pressures under which the free-radically initiated aqueous emulsion polymerization proceeds at a sufficient polymerization rate. They are dependent, in particular, on the free-radical initiator used. Advantageously, the nature and amount of the free-radical initiator, and the polymerization temperature and polymerization pressure, are selected such that there are always sufficient initiating radicals available to initiate and maintain the polymerization reaction.

Suitable reaction temperatures for the free-radical aqueous emulsion polymerization of the invention embrace the entire range from 0 to 170° C. In general the temperatures used are 50 to 120° C., frequently 60 to 110° C., and often 70 to 100° C. The free-radical aqueous emulsion polymerization of the invention can be carried out at a pressure less than, equal to or greater than 1 atm (atmosphere pressure), and the polymerization temperature may consequently exceed 100° C. and amount to up to 170° C. Highly volatile monomers, such as, for example, ethylene, butadiene or vinyl chloride, are preferably polymerized under superatmospheric pressure. This pressure may adopt values of 1.2, 1.5, 2, 5, 10 or 15 bar (absolute) or even higher. Where emulsion polymerizations are carried out under subatmospheric pressure, pressures of 950 mbar, frequently of 900 mbar, and often 850 mbar (absolute) are set. The free-radical aqueous emulsion polymerization of the invention is conducted advantageously at 1 atm in the absence of oxygen, such as under an inert gas atmosphere, such as under nitrogen or argon, for example.

The aqueous reaction medium may in principle also comprise, in minor amounts (≤5% by weight), water-soluble organic solvents, such as methanol, ethanol, isopropanol, butanols, pentanols, but also acetone, etc. With preference, however, the process of the invention is carried out in the absence of such solvents.

Besides the aforementioned components it is also possible optionally in the process of the invention to use free-radical chain transfer compounds in order to reduce or to control the molecular weight of the polymers obtainable by means of the polymerization. Suitable compounds in this context include substantially aliphatic and/or araliphatic halogen compounds, such as n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, such as ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomers, n-octanethiol and its isomers, n-nonanethiol and its isomers, n-decanethiol and its isomers, n-undecanethiol and its isomers, n-dodecanethiol and its isomers, n-tridecanethiol and its isomers, substituted thiols, such as 2-hydroxyethanethiol, aromatic thiols, such as benzenethiol, ortho-, meta-, or para-methylbenzenethiol, and also all other sulfur compounds described in the Polymer Handbook, 3rd edition, 1989, J. Brandrup and E. H. Immergut, John Wiley & Sons, Section II, pages 133-41, but also aliphatic and/or aromatic aldehydes, such as acetaldehyde, propionaldehyde and/or benzaldehyde, unsaturated fatty acids, such as oleic acid, dienes containing nonconjugated double bonds, such as divinylmethane or vinylcyclohexane, or hydrocarbons having readily abstractable hydrogen atoms, such as toluene. It is, however, also possible to use mixtures of mutually compatible aforementioned free-radical chain transfer compounds.

The total amount of free-radical chain transfer compounds used optionally in the process of the invention, based on the total monomer amount, is generally ≤5%, often ≤3%, and frequently ≤1% by weight.

It is often advantageous if a portion or the entirety of the optionally employed free-radical chain transfer compound is supplied to the aqueous polymerization reaction medium before the free-radical emulsion polymerization is initiated. It is particularly favorable, though, if a portion or the entirety of the optionally employed free-radical chain transfer compound is supplied to the aqueous polymerization medium together with the monomers A to B under polymerization conditions.

The metering of any remaining amount of monomers A and B can be effected batchwise in one or more portions or continuously at constant or changing flow rates. The metering of the monomers A to B is preferably effected continuously at constant flow rates.

Furthermore, the remaining amounts of the monomers A to B can be metered in separate individual streams or as a monomer mixture. Preferably, the metering of any remaining amount of the monomers A and B is effected as a monomer mixture, particularly advantageously in the form of an aqueous monomer emulsion. What is important is that, according to the invention, process variants in which the compositions of the respective monomers A and/or B change, for example in a gradient or step procedure familiar to the person skilled in the art, are also to be included.

Particularly advantageously, the process according to the invention is effected in such a way that the monomers A to B are reacted to a conversion of ≥95% by weight, advantageously ≥98% by weight and particularly advantageously ≥99% by weight. It is frequently advantageous if the aqueous polymer dispersion obtained after the end of polymerization stage 2 is subjected to an aftertreatment for reducing the residual monomer content. The aftertreatment is effected either chemically, for example by completion of the polymerization reaction by use of a more effective free radical initiator system (so-called postpolymerization) and/or physically, for example by stripping of the aqueous polymer dispersion with steam or inert gas. Corresponding chemical and/or physical methods are familiar to the skilled person [see for example EP-A 771328, DE-A 19624299, DE-A 19621027, DE-A 19741184, DE-A 19741187, DE-A 19805122, DE-A 19828183, DE-A 19839199, DE-A 19840586 and 19847115]. The combination of chemical and physical aftertreatment has the advantage that, in addition to the unconverted ethylenically unsaturated monomers, other troublesome readily volatile organic constituents (so-called VOCs [volatile organic compounds]) are also removed from the aqueous polymer dispersion.

By targeted variation of type and amount of the monomers A and B, it is possible according to the invention for the skilled person to prepare aqueous polymer dispersions whose polymers have a glass transition temperature or a melting point in the range from −60 to 270° C. Of course, step or multiphase polymers having a plurality of glass transition temperatures can also be prepared.

Advantageously in accordance with the invention it is possible to make use more particularly of those emulsion polymers in aqueous dispersion that comprise as monomers A at least one α,β-ethylenically unsaturated monomer, which is preferably selected from esters of α,β-ethylenically unsaturated monocarboxylic and dicarboxylic acids with $C_1$-$C_{20}$ alkanols, vinylaromatics, esters of vinyl alcohol with $C_1$-$C_{30}$ monocarboxylic acids, ethylenically unsaturated nitriles, vinyl halides, vinylidene halides, monoethylenically unsaturated carboxylic and sulfonic acids, phosphorus monomers, esters of α,β-ethylenically unsaturated monocarboxylic and dicarboxylic acids with $C_2$-$C_{30}$ alkanediols, amides of α,β-ethylenically unsaturated monocarboxylic and dicarboxylic acids with $C_2$-$C_{30}$ amino alcohols which contain a primary or secondary amino group, primary amides of α,β-ethylenically unsaturated monocarboxylic acids and their N-alkyl and N,N-dialkyl derivatives, N-vinyllactams, open-chain N-vinylamide compounds, esters of allyl alcohol with $C_1$-$C_{30}$ monocarboxylic acids, esters of α,β-ethylenically unsaturated monocarboxylic and dicarboxylic acids with amino alcohols, amides of α,β-ethylenically unsaturated monocarboxylic and dicarboxylic acids with diamines which contain at least one primary or secondary amino group, N,N-diallylamines, N,N-diallyl-N-alkylamines, vinyl- and allyl-substituted nitrogen heterocycles, vinyl ethers, $C_2$-$C_8$ monoolefins, nonaromatic hydrocarbons having at least two conjugated double bonds, polyether(meth)acrylates, monomers containing urea groups, and/or mixtures thereof.

Suitable esters of α,β-ethylenically unsaturated monocarboxylic and dicarboxylic acids with $C_1$-$C_{20}$ alkanols are methyl(meth)acrylate, methyl ethacrylate, ethyl(meth)acrylate, ethyl ethacrylate, n-propyl(meth)acrylate, isopropyl (meth)acrylate, n-butyl(meth)acrylate, sec-butyl(meth)acrylate, tert-butyl(meth)acrylate, tert-butyl ethacrylate, n-hexyl (meth)acrylate, n-heptyl(meth)acrylate, n-octyl(meth) acrylate, 1,1,3,3-tetramethylbutyl(meth)acrylate, ethylhexyl (meth)acrylate, propylheptyl(meth)acrylate, n-nonyl(meth) acrylate, n-decyl(meth)acrylate, n-undecyl(meth)acrylate, tridecyl(meth)acrylate, myristyl(meth)acrylate, pentadecyl (meth)acrylate, palmityl(meth)acrylate, heptadecyl(meth) acrylate, nonadecyl(meth)acrylate, arachinyl(meth)acrylate, behenyl(meth)acrylate, lignoceryl(meth)acrylate, cerotinyl (meth)acrylate, melissinyl(meth)acrylate, stearyl(meth)acrylate, lauryl(meth)acrylate, and mixtures thereof.

Preferred vinylaromatics are styrene, 2-methylstyrene, 4-methylstyrene, 2-(n-butyl)styrene, 4-(n-butyl)styrene, 4-(n-decyl)styrene, and, with particular preference, styrene.

Suitable esters of vinyl alcohol with $C_1$-$C_{30}$ monocarboxylic acids are, for example, vinyl formate, vinyl acetate, vinyl propionate, vinyl butyrate, vinyl laurate, vinyl stearate, vinyl propionate, Versatic acid vinyl esters, and mixtures thereof.

Suitable ethylenically unsaturated nitriles are acrylonitrile, methacrylonitrile, and mixtures thereof.

Suitable vinyl halides and vinylidene halides are vinyl chloride, vinylidene chloride, vinyl fluoride, vinylidene fluoride, and mixtures thereof.

Suitable ethylenically unsaturated carboxylic acids, sulfonic acids and phosphonic acids or their derivatives are acrylic acid, methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, the monoesters of monoethylenically unsaturated dicarboxylic acids having 4 to 10, preferably 4 to 6, carbon atoms, e.g., monomethyl maleate, vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, and 2-acrylamido-2-methylpropanesulfonic acid. Suitable styrenesulfonic acids and derivatives thereof are styrene-4-sulfonic acid and styrene-3-sulfonic acid and the alkali metal or alkaline earth metal salts thereof, such as sodium styrene-3-sulfonate and sodium styrene-4-sulfonate, for example. Particularly preferred are acrylic acid, methacrylic acid, and mixtures thereof.

Examples of phosphorus-containing monomers are vinylphosphonic acid and allylphosphonic acid, for example. Also suitable are the monoesters and diesters of phosphonic acid and phosphoric acid with hydroxyalkyl(meth)acrylates, especially the monoesters. Additionally suitable are diesters of phosphonic acid and phosphoric acid that have been esterified once with hydroxyalkyl(meth)acrylate and also once with a different alcohol, such as an alkanol, for example. Suitable hydroxyalkyl(meth)acrylates for these esters are those specified below as separate monomers, more particularly 2-hydroxyethyl(meth)acrylate, 3-hydroxypropyl(meth) acrylate, 4-hydroxybutyl(meth)acrylate, etc. Corresponding dihydrogen phosphate ester monomers comprise phosphoalkyl(meth)acrylates, such as 2-phosphoethyl(meth)acrylate, 2-phosphopropyl(meth)acrylate, 3-phosphopropyl(meth) acrylate, phosphobutyl(meth)acrylate, and 3-phospho-2-hydroxypropyl(meth)acrylate. Also suitable are the esters of phosphonic acid and phosphoric acid with alkoxylated hydroxyalkyl(meth)acrylates, examples being the ethylene oxide condensates of (meth)acrylates, such as $H_2C=C(CH_3)COO(CH_2CH_2O)_nP(OH)_2$ and $H_2C=C(CH_3)COO(CH_2CH_2O)_nP(=O)(OH)_2$, in which n is 1 to 50. Of further suitability are phosphoalkyl crotonates, phosphoalkyl maleates, phosphoalkyl fumarates, phosphodialkyl(meth)acrylates, phosphodialkyl crotonates and allyl phosphates. Further suitable monomers containing phosphorus groups are described in WO 99/25780 and U.S. Pat. No. 4,733,005, hereby incorporated by reference.

Suitable esters of α,β-ethylenically unsaturated monocarboxylic and dicarboxylic acids with $C_2$-$C_{30}$ alkanediols are, for example, 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, etc.

Suitable primary amides of α,β-ethylenically unsaturated monocarboxylic acids and their N-alkyl and N,N-dialkyl derivatives are acrylamide, methacrylamide, N-methyl(meth) acrylamide, N-ethyl(meth)acrylamide, N-propyl(meth)acrylamide, N-(n-butyl)(meth)acrylamide, N-(tert-butyl)(meth) acrylamide, N-(n-octyl)(meth)acrylamide, N-(1,1,3,3-tetramethylbutyl)(meth)acrylamide, N-ethylhexyl(meth) acrylamide, N-(n-nonyl)(meth)acrylamide, N-(n-decyl) (meth)acrylamide, N-(n-undecyl)(meth)acrylamide, N-tridecyl(meth)acrylamide, N-myristyl(meth)acrylamide, N-pentadecyl(meth)acrylamide, N-palmityl(meth)acrylamide, N-heptadecyl(meth)acrylamide, N-nonadecyl(meth) acrylamide, N-arachidyl(meth)acrylamide, N-behenyl(meth) acrylamide, N-lignoceryl(meth)acrylamide, N-cerotinyl (meth)acrylamide, N-melissinyl(meth)acrylamide, N-stearyl (meth)acrylamide, N-lauryl(meth)acrylamide, N,N-dimethyl (meth)acrylamide, N,N-diethyl(meth)acrylamide, morpholinyl(meth)acrylamide.

Suitable N-vinyllactams and their derivatives are, for example, N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, N-vinyl-7-ethyl-2-caprolactam, etc.

Suitable open-chain N-vinylamide compounds are, for example, N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide, and N-vinylbutyramide.

Suitable esters of α,β-ethylenically unsaturated monocarboxylic and dicarboxylic acids with amino alcohols are N,N-dimethylaminomethyl(meth)acrylate, N,N-dimethylaminoethyl(meth)acrylate, N,N-diethylaminoethyl acrylate, N,N-dimethylaminopropyl(meth)acrylate, N,N-diethylaminopropyl(meth)acrylate, and N,N-dimethylaminocyclohexyl(meth)acrylate.

Suitable amides of α,β-ethylenically unsaturated monocarboxylic and dicarboxylic acids with diamines which contain at least one primary or secondary amino group are N-[2-(dimethylamino)ethyl]acrylamide, N-[2-(dimethylamino) ethyl]methacrylamide, N-[3-(dimethylamino)propyl] acrylamide, N-[3-(dimethylamino)propyl]methacrylamide, N-[4-(dimethylamino)butyl]acrylamide, N-[4-(dimethylamino)butyl]methacrylamide, N-[2-(diethylamino)ethyl] acrylamide, N-[4-(dimethylamino)cyclohexyl]acrylamide, N-[4-(dimethylamino)cyclohexyl]methacrylamide, etc.

Suitable monomers A are, furthermore, N,N-diallylamines and N,N-diallyl-N-alkylamines and their acid addition salts and quaternization products. Alkyl here is preferably $C_1$-$C_{24}$ alkyl. Preference is given to N,N-diallyl-N-methylamine and to N,N-diallyl-N,N-dimethylammonium compounds, such as the chlorides and bromides, for example.

Further suitable monomers A are vinyl- and allyl-substituted nitrogen heterocycles, such as N-vinylimidazole, N-vinyl-2-methylimidazole, and vinyl- and allyl-substituted heteroaromatic compounds, such as 2- and 4-vinylpyridine, 2- and 4-allylpyridine, and the salts thereof.

Suitable $C_2$-$C_8$ monoolefins and nonaromatic hydrocarbons having at least two conjugated double bonds are for example ethylene, propylene, isobutylene, isoprene, butadiene, etc.

Examples of suitable monomers A containing urea groups are N-vinylurea or N-allylurea or derivatives of imidazolidin-2-one. They include N-vinyl- and N-allylimidazolidin-2-one, N-vinyloxyethylimidazolidin-2-one, N-(2-(meth)acrylamidoethyl)imidazolidin-2-one.

Preferred monomers containing urea groups are N-(2-acryloxyethyl)imidazolidin-2-one and N-(2-methacryloxyethyl) imidazolidin-2-one. Particular preference is given to N-(2-methacryloxyethyl)imidazolidin-2-one (2-ureido methacrylate, UMA).

And also crosslinking monomers, examples being monomers which carry keto groups or aldehyde groups, such as (meth)acrolein, diacetoneacrylamide (DAAM), acetoacetoxyethyl methacrylate (AAEM), which may be combined with adipic dihydrazide (ADDH) or diamines, and also monomers which carry epoxide groups, such as glycidyl methacrylate (GMA), or diolefinically unsaturated compounds such as allyl(meth)acrylate (AMA), butanediol diacrylate, hexanediol diacrylate, for instance.

The aforementioned monomers A may be used individually, in the form of mixtures within one class of monomer or in the form of mixtures from different classes of monomer.

It is preferred in accordance with the invention to use those emulsion polymers which in addition to the monomers A comprise the monomers B in amounts of 0.1% to 30% by weight and component C, the at least one photoinitiator, in amounts of 0.01% to 5% by weight, in each case based on the sum of the monomers.

It is preferred in accordance with the invention to use those emulsion polymers, present in aqueous dispersion, whose glass transition temperature is 100° C., more particularly 60° C., preferably >−50° C. and ≤30° C., especially ≤10° C. and advantageously ≥−40° C. and ≤0° C. By the glass transition temperature (Tg) is meant the limiting value of the glass transition temperature toward which the latter tends with increasing molecular weight, according to G. Kanig (Kolloid-Zeitschrift & Zeitschrift für Polymere, vol. 190, page 1, equation 1). The glass transition temperature is determined by the DSC method (Differential Scanning Calorimetry, 20 K/min, midpoint measurement, DIN 53 765).

In the case of a staged or gradient polymerization, the emulsion polymers may of course also have two or more glass transition temperatures.

According to Fox (T. G. Fox, Bull. Am. Phys. Soc. 1956 [Ser. II] 1, page 123 and in accordance with Ullmann's Encyclopadie der technischen Chemie, vol. 19, page 18, 4th edition, Verlag Chemie, Weinheim, 1980), the glass transition temperature of comonomers with no more than low degrees of crosslinking is given in good approximation by:

$$1/Tg = x1/Tg1 + x2/Tg2 + \ldots xn/Tgn,$$

where x1, x2, ... xn are the mass fractions of the monomers 1, 2, ... n and Tg1, Tg2, ... Tgn are the glass transition temperatures of the polymers constructed in each case only from one of the monomers 1, 2, ... n in degrees Kelvin. The Tg values for the homopolymers for the majority of monomers are known and are listed in, for example, Ullmann's Encyclopedia of Industrial Chemistry, 5th edition, vol. A21, page 169, Verlag Chemie, Weinheim, 1992; further sources of glass transition temperatures for homopolymers include, for example, J. Brandrup, E. H. Immergut, Polymer Handbook, 1st Ed., J. Wiley, New York, 1966; 2nd Ed., J. Wiley, New York, 1975; and 3rd Ed., J. Wiley, New York, 1989.

The average diameter of the emulsion polymers present in aqueous dispersion (polymer particles) is generally in the range from 10 to 1000 nm, often 50 to 500 nm or 80 to 300 nm. The particle size distribution may be monomodal or multimodal. In the case of a bimodal particle size distribution, the finely divided component has particle diameters of preferably 50 to 150 nm, while the coarse-particled component has diameters of preferably 200 to 500 nm. The solids contents of the aqueous dispersions of emulsion polymers that can be used in accordance with the invention, furthermore, are generally ≥10% and ≤70%, advantageously ≥30% and ≤70% and with particular advantage ≥40% and ≤65%, by weight.

The solids content has been determined, generally speaking, by drying a defined amount of the aqueous polymer dispersion (approximately 1 g) to constant weight in an aluminum crucible having an internal diameter of around 5 cm at 140° C. in a drying cabinet. Two separate measurements were carried out. The figures reported in the examples represent the average value of the two measurement results in each case.

The particle size of the polymer particles was determined by dynamic light scattering on a 0.01% by weight dispersion at 23° C., using a high performance particle sizer (HPPS) from Malvern Instruments, UK. The figure reported was the cumulant z-average of the measured autocorrelation function.

The monomers B used are known per se to the skilled person and are described in, for example, publications WO 2009/047234 and WO 2009/146995, hereby incorporated in full by reference.

According to one particular embodiment of the present invention, the monomers B may have an iodine number in the range from 50 to 300 g iodine/100 g, more preferably in the range from 50 to 200 g iodine/100 g, more particularly preferably 50 to 180 g iodine/100 g, very preferably 80 to 150 g iodine/100 g monomer.

The iodine number was determined by the method of Kaufmann, DGF Standard Methods C-V 11b (2002).

The notation "(meth)acryl-" stands for acrylic and methacrylic radicals, with methacrylic radicals being preferred. Particularly preferred monomers B are methacryloyloxy-2-ethyl-oleamide, methacryloyloxy-2-ethyl-linoleamide and/or methacryloyloxy-2-ethyl-linoleneamide, and also methacryloyloxy-2-hydroxypropyl-linoleic ester and methacryloyloxy-2-hydroxypropyl-oleic ester.

The reaction of the methacrylates of the monomers B takes place preferably with suitable fatty acids.

The preferred (meth)acrylates of the invention include more particularly octadecane-dien-yl(meth)acrylate, octadecane-trien-yl(meth)acrylate, hexadecenyl(meth)acrylate, octadecenyl(meth)acrylate and hexadecane-dien-yl(meth)acrylate.

Furthermore, (meth)acrylates which in the alkyl radical have at least one double bond and 8 to 40 carbon atoms can also be obtained by reaction of unsaturated fatty acids with meth(acrylates) which have reactive groups in the alcohol residue. The reactive groups include, in particular, hydroxyl groups and also epoxy groups. Accordingly, for example, use may also be made, as reactants for preparing the aforementioned (meth)acrylates, of hydroxyalkyl(meth)acrylates, such as 3-hydroxypropyl(meth)acrylate, 3,4-dihydroxybutyl (meth)acrylate, 2-hydroxyethyl(meth)acrylate, 2-hydroxypropyl(meth)acrylate, 2,5-dimethyl-1,6-hexanediol(meth)acrylate, and 1,10-decanediol(meth)acrylate; or (meth)acrylates containing epoxy groups, an example being glycidyl(meth)acrylate.

Suitable fatty acids for reaction of the aforementioned (meth)acrylates are widely available commercially and are obtained from natural sources. They include, among others, undecylenic acid, palmitoleic acid, oleic acid, elaidic acid, vaccenic acid, icosenoic acid, cetoleic acid, erucic acid, nervonic acid, linoleic acid, linolenic acid, arachidonic acid, timnodonic acid, clupanodonic acid and/or cervonic acid.

The especially preferred (meth)acrylates include more particularly (meth)acryloyloxy-2-hydroxypropyllinoleic ester, (meth)acryloyloxy-2-hydroxypropyl-linolenic ester and (meth)acryloyloxy-2-hydroxypropyl-oleic ester.

The reaction of the unsaturated fatty acids with (meth)acrylates which have reactive groups in the alcohol residue is known per se and set out in, for example, DE-A-41 05 134, DE-A-25 13 516, DE-A-26 38 544 and U.S. Pat. No. 5,750,751.

The aforesaid (meth)acrylates with at least one double bond may be used individually or as a mixture of two or more (meth)acrylates.

Advantages may be achieved in particular with (meth)acrylate segments which comprise at least 5%, preferably at least 10%, and more preferably at least 15%, by weight, of units deriving from (meth)acryloyloxy-2-hydroxypropyl-oleic ester, based on the weight of the units derived from (meth)acrylates which in the alkyl radical have at least one double bond and 8 to 40 carbon atoms. The polymer preferably has 15% to 45%, more preferably 20% to 35%, by weight of units deriving from (meth)acryloyloxy-2-hydroxypropyl-oleic ester, based on the weight of the units deriving from (meth)acrylates which in the alkyl radical have at least one double bond and 8 to 40 carbon atoms.

According to a further aspect of the present invention, preference is given to (meth)acrylate segments which comprise at least 20%, preferably at least 40%, and more preferably at least 50%, by weight, of units deriving from (meth)acryloyloxy-2-hydroxypropyl-linoleic ester, based on the weight of the units derived from (meth)acrylates which in the alkyl radical have at least one double bond and 8 to 40 carbon atoms. The polymer preferably has 45% to 80%, more preferably 55% to 70%, by weight of units deriving from (meth)acryloyloxy-2-hydroxypropyl-linoleic ester, based on the weight of the units deriving from (meth)acrylates which in the alkyl radical have at least one double bond and 8 to 40 carbon atoms.

The monomers B are used in amounts of 0.1% to 30% by weight, preferably 0.1% to 10% by weight, more preferably in amounts of 0.5% to 8% by weight, based in each case on the total weight of the monomers.

Component C, the at least one photoinitiator, may either be copolymerized or else added after the actual emulsion polymerization. If it is added after the actual emulsion polymerization, stirring is continued thereafter until the at least one photoinitiator is homogeneously dispersed. In the case of a solid, it is often advantageous to add the at least one photoinitiator under hot conditions, i.e. at temperatures above the melting point. There are also, for example, benzophenone derivatives in liquid form. They can simply be added to the polymer dispersion and incorporated by stirring. One example of such a derivative is Esacure® TZM from Lehmann & Voss & Co., Germany. Where the at least one photoinitiator possesses copolymerizable double bonds, it may also be metered in during the polymerization. This may take place in a separate feed or together with the monomers A and/or B. It is preferred to add the copolymerizable photoinitiator with the monomers A and B.

The component C, the at least one photoinitiator, comprises, for example, benzophenone or acetophenone or derivatives with benzophenone or acetophenone substructures, such as substituted benzophenones, for instance 4-methylbenzophenone, 2,4,6-trimethylbenzophenone, thioxanthones, such as isopropylthioxanthone, or olefinically unsaturated derivatives of benzophenone or of acetophenone, examples being those with a (meth)acrylic radical such as (meth)acryloxyethoxybenzophenone, or with a vinyl group such as 4-vinyloxybenzophenone, or mixtures of these active ingredients, such as 4-methylbenzophenone and 2,4,6-trimethylbenzophenone, for example. Other photoinitiators contemplated are described in EP 417 568, page 3, line 39 to page 7, line 51, hereby incorporated by reference.

The emulsion polymers of the invention possess (poly)olefinically unsaturated side chains, and are therefore oxidatively crosslinkable in a similar way to, for example, alkyd resins, with the aid of what are called dryers (siccatives). Dryers are metal compounds with usually Co compounds or Mn compounds, occasionally also Fe compounds, as active component, and catalyze the reaction of the (poly)olefinically unsaturated alkyl chains with atmospheric oxygen (cf. U. Poth, Polyester and Alkydharze, p. 183 f). Surprisingly, the addition of dryers to the polymer dispersions of the invention had no effect on the soiling of coating films produced therefrom. In the polymer dispersions and in the coating materials based thereon, therefore, it is preferred not to use dryers.

The present invention also provides coating materials, preferably exterior architectural paints, comprising the aqueous polymer dispersions of the invention as binders.

This also includes coating materials which dry to form elastic coatings.

Elastic coating compositions of this type are intended to bridge fine cracks on the building exterior and thus to protect buildings reliably against moisture and other weathering effects.

The coating materials of the invention are produced in conventional ways by blending the components in mixing apparatus customary for the purpose. It has been found appropriate to prepare an aqueous paste or dispersion to start with from the pigments, fillers, water, and any auxiliaries, and only then to add the aqueous polymer dispersion, with stirring as an option.

Coating materials of the invention comprise (in the wet state)

i. 10% to 98%, preferably 20% to 80%, more preferably 30% to 50% by weight of the polymer dispersion of the invention, ii. 0% to 60%, preferably 1% to 50%, more preferably 5% to 30% by weight of one or more inorganic fillers, iii. 0% to 5%, preferably 0.01% to 3%, more preferably 0.05% to 2.5% by weight of one or more thickeners, iv. 0% to 30%, preferably 1% to 25%, by weight of one or more pigments, and v. 0% to 20%, preferably 0% to 10%, more preferably 0% to 5% by weight each of other auxiliaries, such as, for example, biocides, dispersants, film-forming assistants, and defoamers, vi. water, the sum of components i. to vi. being 100% by weight.

Finely divided inorganic fillers (ii) used are substantially inorganic materials having refractive indices lower by comparison with the pigments. The finely divided fillers are often naturally occurring minerals, such as, for example, calcite, chalk, dolomite, kaolin, talc, talc/chlorite intergrowths, mica, diatomaceous earth, baryte, and quartz, but also synthetically prepared inorganic compounds, such as, for example, precipitated calcium carbonate, calcined kaolin or barium sulfate, and fumed silica. As a filler it is preferred to use calcium carbonate in the form of crystalline calcite or of amorphous chalk.

Preferred inorganic fillers are the Omyacarb® products from Omya and the Finntalc® products from Mondo Minerals, the Celite® and Optimat™ products from World Minerals, and the Aerosil® products from Evonik Industries AG.

Pigments (iv) used are finely divided inorganic and organic compounds. The most important white pigment, on account of its high refractive index and its high opacity, is titanium dioxide, in the form of its anatase and rutile modifications. Examples of typical commercial products include the Kronos® products from Kronos, the Tiona® products from Millenium, the TIOXIDE® products from Huntsman, Ti-Pure® products from Du-Pont de Nemours. Additionally, however, zinc oxide and zinc sulfide are used as white pigments. As well as these, however, organic white pigments too, such as non-film-forming, styrene- (and carboxyl-)rich, hollow polymer particles with a particle size of around 300 to 400 nm (referred to as opaque particles) are used, examples being Rhopaque products from Dow.

As well as white pigments, any of a very wide variety of chromatic pigments familiar to the skilled person are used for coloring the coating, examples being the somewhat less expensive inorganic iron, cadmium, chromium, and lead oxides and sulfides, lead molybdate, cobalt blue, carbon black, and also the somewhat more expensive organic pigments, examples being phthalocyanines, azo pigments, quinacridones, perylenes, carbozoles.

The thickeners iii. are generally compounds of high molecular mass which absorb water and in doing so swell to form bulky structures, or are amphiphilic molecules which possess at least two hydrophobic groups and form relatively loose lattice structures in water via micelles.

Examples are high molecular mass polymers based on acrylic acid and acrylamide (for example, Collacral® HP from BASF SE), carboxyl-rich acrylic ester copolymers such as Latekoll® D (BASF SE)—the latter may also possess hydrophobic groups as well (HASE thickeners), and also PU associative thickeners (for example, Collacral® PU 75 from BASF SE), celluloses and their derivatives, examples being cellulose ethers (Natrosol grades from Ashland-Aqualon) or carboxymethylcellulose, and also natural thickeners, such as bentonites, alginates or starch, for example.

The thickeners (iii.) are used in amounts of 0% to 5% by weight, preferably 0.1% to 2.5% by weight.

The further auxiliaries (v.) include, for example, preservatives for preventing fungal and bacterial infestation, solvents for influencing the open time, such as ethylene glycol or propylene glycol, and the formation of a film, such as butyl glycol, butyl diglycol, propylene glycol ethers such as, for instance, Dowanol PP, DPM or DPnB (Dow), Texanol (Eastman), high-boiling esters, examples being diisobutyl esters of glutaric, succinic, and adipic acid, dispersants for stabilizing the finely dispersed pigment and filler particles, examples being polycarboxylates such as, for instance, Pigmentverteiler A or NL (BASF SE) or oligophosphates or polyphosphates such as Calgon N, emulsifiers (Emulphor® OPS 25, Lutensol® TO 89), antifreeze agents (ethylene glycol, propylene glycol) or defoamers (Lumiten® products).

Determination of the pH was performed in accordance with DIN 53785. The instrument was a pH meter from Methrom, a Titroprocessor 682. Around 50 ml of the sample are placed in a 100 ml glass beaker. The sample is subsequently conditioned at 23±1° C. in a thermostat. The glass electrode is kept ideally in a 3-molar KCl solution. Prior to measurement, it is washed a number of times with the polymer dispersion and then immersed into the sample. When the position of the pointer on the display of the meter is constant, the pH is read off.

Three determinations are carried out, in each case with new samples, on the dispersion to be measured.

The Xenotest was carried out as follows:

The test specimens were weathered in accordance with DIN EN ISO 11341: December 2004 in a Heraeus Xenotest 1200 weathering apparatus for a total of 48 hours (3 xenon lamps each of 4500 W, irradiance at 300-400 nm (3 times Suprax specialty glass filters) around 60 $W/m^2$, test chamber temperature in the dry period 38+/−3° C., relative humidity 65+/−5%, black standard temperature in the dry period 65+/−3° C., parallel operation, radiation source continually in operation, dry period 102 min, irrigation 18 min, beginning with dry period).

EXAMPLE 1

E 1

A polymerization vessel equipped with metering devices and temperature regulation was charged under a nitrogen atmosphere at 20 to 25° C. (room temperature) with
307.9 g of deionized water and
41.9 g of a 33% strength by weight aqueous solution of a polystyrene seed dispersion
and this initial charge was heated to 85° C. with stirring. When this temperature was reached, 39.6 g of a 1.8% strength by weight aqueous solution of sodium peroxodisulfate were added and the mixture was stirred for 5 minutes, during which this temperature was maintained. Thereafter feeds 1 and 2 were commenced; feed 1 was metered in over 180 minutes, and feed 2 over 210 minutes. After the end of feed 2, polymerization was continued for 30 minutes, followed by cooling to 75° C., after which feeds 3 and 4 were metered in over 60 minutes in parallel. Subsequently, feed 5 was commenced and was metered in over the course of 30 minutes.
Feed 1 (homogeneous mixture of):
436.1 g of deionized water
50.0 g of Emulan® OG (BASF SE)
60.6 g of Disponil® FES 77 (Cognis, DE)
16.0 g of a 50% strength by weight aqueous solution of acrylamide
28.0 g of acrylic acid
294.2 g of styrene
619.8 g of n-butyl acrylate
50.0 g of monomer B4
Feed 2 (homogeneous solution of):
30.5 g of deionized water and
2.3 g of sodium peroxodisulfate
Feed 3:
18.0 g of a 10% strength aqueous solution of tert-butyl hydroperoxide
Feed 4 (homogeneous mixture of):
13.5 g of deionized water and
1.5 g of ascorbic acid Feed 5:

14.0 g of a 5% strength by weight aqueous solution of hydrogen peroxide

After the end of feed 5, 14.8 g of a 25% strength by weight ammonia solution were added. The aqueous polymer dispersion obtained was subsequently cooled to room temperature. At a temperature of 60° C., 1.5 g of benzophenone were added. Lastly, the dispersion was filtered through a 125 μm filter.

The resultant 2040.2 g of the aqueous polymer dispersion had a solids content of 51.8% by weight and a pH of 7.2. Diluted with deionized water, the aqueous polymer dispersion had a weight-average particle diameter of 143 nm.

COMPARATIVE EXAMPLE 1

CE 1

A polymerization vessel equipped with metering devices and temperature regulation was charged under a nitrogen atmosphere at 20 to 25° C. (room temperature) with 307.9 g of deionized water and 41.9 g of a 33% strength by weight aqueous solution of a polystyrene seed dispersion and this initial charge was heated to 85° C. with stirring. When this temperature was reached, 39.6 g of a 1.8% strength by weight aqueous solution of sodium peroxodisulfate were added and the mixture was stirred for 5 minutes, during which this temperature was maintained. Thereafter feeds 1 and 2 were commenced; feed 1 was metered in over 180 minutes, and feed 2 over 210 minutes. After the end of feed 2, polymerization was continued for 30 minutes, followed by cooling to 75° C., after which feeds 3 and 4 were metered in over 60 minutes in parallel. Subsequently, feed 5 was commenced and was metered in over the course of 30 minutes.

Feed 1 (homogeneous mixture of):

436.1 g of deionized water 50.0 g of Emulan® OG 60.6 g of Disponil® FES 77

16.0 g of a 50% strength by weight aqueous solution of acrylamide 28.0 g of acrylic acid 294.2 g of styrene 619.8 g of n-butyl acrylate 50.0 g of monomer B4

Feed 2 (homogeneous solution of):

30.5 g of deionized water and 2.3 g of sodium peroxodisulfate

Feed 3:

18.0 g of a 10% strength by weight aqueous solution of tert-butyl hydroperoxide

Feed 4 (homogeneous mixture of):

13.5 g of deionized water and 1.5 g of ascorbic acid

Feed 5:

After the end of feed 5, 14.8 g of a 25% strength by weight ammonia solution were added. The aqueous polymer dispersion obtained was subsequently cooled to room temperature. Lastly, the dispersion was filtered through a 125 μm filter.

The resultant 2038.7 g of the aqueous polymer dispersion had a solids content of 51.3% by weight and a pH of 7.2. Diluted with deionized water, the aqueous polymer dispersion had a weight-average particle diameter of 143 nm.

COMPARATIVE EXAMPLE 2

CE 2

A polymerization vessel equipped with metering devices and temperature regulation was charged under a nitrogen atmosphere at 20 to 25° C. (room temperature) with 307.9 g of deionized water and 41.9 g of a 33% strength by weight aqueous solution of a polystyrene seed dispersion and this initial charge was heated to 85° C. with stirring. When this temperature was reached, 39.6 g of a 1.8% strength by weight aqueous solution of sodium peroxodisulfate were added and the mixture was stirred for 5 minutes, during which this temperature was maintained. Thereafter feeds 1 and 2 were commenced; feed 1 was metered in over 180 minutes, and feed 2 over 210 minutes. After the end of feed 2, polymerization was continued for 30 minutes, followed by cooling to 75° C., after which feeds 3 and 4 were metered in over 60 minutes in parallel. Subsequently, feed 5 was commenced and was metered in over the course of 30 minutes.

Feed 1 (homogeneous mixture of):

436.1 g of deionized water 50.0 g of Emulan® OG 60.6 g of Disponil® FES 77

16.0 g of a 50% strength by weight aqueous solution of acrylamide 28.0 g of acrylic acid 294.2 g of styrene 669.8 g of n-butyl acrylate Feed 2 (homogeneous solution of):

30.5 g of deionized water and 2.3 g of sodium peroxodisulfate

Feed 3:

18.0 g of a 10% strength by weight aqueous solution of tert-butyl hydroperoxide

Feed 4 (homogeneous mixture of):

13.5 g of deionized water and 1.5 g of ascorbic acid

Feed 5:

14.0 g of a 5% strength by weight aqueous solution of hydrogen peroxide

After the end of feed 5, 14.8 g of a 25% strength by weight ammonia solution were added.

The aqueous polymer dispersion obtained was subsequently cooled to room temperature. At a temperature of 60° C., 1.5 g of benzophenone were added. Lastly, the dispersion was filtered through a 125 μm filter.

The resultant 2040.2 g of the aqueous polymer dispersion had a solids content of 51.5% by weight and a pH of 7.5. Diluted with deionized water, the aqueous polymer dispersion had a weight-average particle diameter of 136 nm.

Monomer B1

(Preparation of a Mixture of Methacryloyloxy-2-ethyl-Fatty Acid Amides)

A four-neck, round-bottom flask equipped with a saber stirrer with stirring sleeve and stirring motor, nitrogen inlet, liquid-phase thermometer and a distillation bridge was charged with 206.3 g (0.70 mol) of fatty acid methyl ester mixture, 42.8 g (0.70 mol) of ethanolamine and 0.27 g (0.26%) of LiOH. The fatty acid methyl ester mixture comprised 6% by weight of saturated C12 to C16 fatty acid methyl esters, 2.5% by weight of saturated C17 to C20 fatty acid methyl esters, 52% by weight of monounsaturated C18 fatty acid methyl esters, 1.5% by weight of monounsaturated C20 to C24 fatty acid methyl esters, 36% by weight of polyunsaturated C18 fatty acid methyl esters, and 2% by weight of polyunsaturated C20 to C24 fatty acid methyl esters.

The reaction mixture was heated to 150° C. Over the course of 2 hours, 19.5 ml of methanol were taken off by distillation. The resulting reaction product contained 86.5% of fatty acid ethanolamides. The reaction mixture obtained was processed further without purification. After cooling had taken place, 1919 g (19.2 mol) of methyl methacrylate, 3.1 g of LiOH, and an inhibitor mixture consisting of 500 ppm of hydroquinone monomethyl ether and 500 ppm of phenothiazine were added.

The reaction apparatus was flushed with nitrogen for 10 minutes with stirring. Thereafter the reaction mixture was heated to boiling. The methyl methacrylate/methanol azeotrope was removed and subsequently the overhead temperature was raised in steps to 100° C. After the end of the reaction, the reaction mixture was cooled to around 70° C. and filtered. Excess methyl methacrylate was removed on a rotary evaporator. This gave 370 g of product.

Monomer B2

A four-neck, round-bottom flask equipped with a saber stirrer with stirring sleeve and stirring motor, nitrogen inlet, liquid-phase thermometer and a distillation bridge was charged with 206.3 g (0.70 mol) of fatty acid methyl ester mixture, 42.8 g (0.70 mol) of ethanolamine and 0.27 g (0.26%) of LiOH. The fatty acid methyl ester mixture comprised 6% by weight of saturated C12 to C16 fatty acid methyl esters, 2.5% by weight of saturated C17 to C20 fatty acid methyl esters, 52% by weight of monounsaturated C18 fatty acid methyl esters, 1.5% by weight of monounsaturated C20 to C24 fatty acid methyl esters, 36% by weight of polyunsaturated C18 fatty acid methyl esters, and 2% by weight of polyunsaturated C20 to C24 fatty acid methyl esters.

The reaction mixture was heated to 150° C. Over the course of 2 hours, 19.5 ml of methanol were taken off by distillation. The resulting reaction product contained 86.5% of fatty acid ethanolamides. The reaction mixture obtained was processed further without purification. Following the addition of an inhibitor mixture of 500 ppm of hydroquinone monomethyl ether and 500 ppm of phenothiazine, 108 g (0.70 mol) of methacrylic anhydride were metered in slowly at a liquid-phase temperature of 80° C. The reaction mixture was heated to 90° C. and stirred at this temperature for 6 hours. The methacrylic acid formed was removed on a thin-film evaporator. This gave a brown liquid product.

Monomer B3 (methacryloyloxy-2-hydroxypropyl-linoleic ester)

Monomer B3 was obtained by reacting linoleic acid with glycidyl methacrylate.

Monomer B4 (methacryloyloxy-2-hydroxypropyl-oleic ester)

Monomer B4 was obtained by reacting oleic acid with glycidyl methacrylate.

Production of the Coating Materials

| Formulation: | | without dryer | with dryer |
|---|---|---|---|
| Water | | 100 | 100 |
| Pigmentverteiler ® A | dispersant from BASF SE | 5 | 5 |
| Parmetol ® A26 | preservative from Schülke&Mayr | 2 | 2 |
| Byk ® 023 | defoamer from Byk | 2 | 2 |
| Propylene glycol | solvent | 20 | 20 |
| Butyldiglycol | solvent | 15 | 15 |

-continued

| Formulation: | | without dryer | with dryer |
|---|---|---|---|
| Ammonia, conc. | | 2 | 2 |
| Collacral ® LR 8990, 40% form | thickener from BASF SE | 4 | 4 |
| Natrosol ® 250HR | thickener from Hercules Inc. | 3 | 3 |
| . . . add in order and briefly disperse . . . | | | |
| Kronos ® RN 2190 titanium dioxide | pigment from Kronos International Inc. | 125 | 125 |
| Omyacarb ® 5 GU | filler from Omya | 240 | 240 |
| . . . add in order and disperse for 15 minutes at 1000 rpm with a toothed disk stirrer . . . | | | |
| Dispersion (51.8%) | | 454 | 454 |
| Byk ® 023 | defoamer from Byk | 4 | 4 |
| Water | | 24 | 24 |
| Additol ® VXW 4940 | dryer (siccative) from Cytec | — | 0.39 |
| Total amount: | | 1000 | 1000 |

The ingredients were added in the order indicated above, with stirring. The paints were left to age at room temperature for 24 hours.

Processing and Testing

Before being coated, fiber cement plaques were initially dewatered, brushed off while wet, and dried. The coating materials were applied each in 2 layers (with drying for 16 hours in between) by brush, at 500 g/m² in each case. The coatings were dried for 3 days at 23° C. and 50% relative humidity. Then, with the aid of a Color guide 45/0 from Byk Gardner, the colorimetric parameters L, a and b were ascertained (standard illuminant C 2).

The test specimens were weathered in a Xenotest 1200 weathering apparatus as indicated above for 48 hours. After weathering, the test specimens were dried. Activated carbon, dry, was then scattered on to form a covering. Excess activated carbon was removed by tapping on the edge or using compressed air. The soiled test specimens were subsequently immersed in water, rinsed off with in each case 1 l of running water, and, lastly, wiped off three times with a wet sponge, without pressure. After drying, a determination was made, as above, of the colorimetric parameters of the soiled area, and of the difference ΔE relative to the initial value before weathering and soiling.

Furthermore, the soiled test specimens were placed alongside one another and the degree of soiling was evaluated using school grades (0=white, 5=black).

| | Monomer | Photoinitiator | | After 3 d RT + 6 h Xenotest | |
|---|---|---|---|---|---|
| Sample | B4 | (component C) | Siccative | ΔE | school grade |
| E 1 | yes | yes | no | 5.5 | 2 |
| | yes | yes | yes | 6.5 | 2 |
| CE 1 | yes | no | no | 22.8 | 4-5 |
| | yes | no | yes | 14.6 | 4 |
| CE 2 | no | yes | no | 12.8 | 3-4 |

From these figures it is clearly apparent that the combination of monomer B4 and photoinitiator produces the improvement in the soiling resistance after light exposure, and also that this improvement is significantly greater than if only photoinitiator is used. The addition of siccative does not produce any improvement.

The invention claimed is:

1. An aqueous emulsion polymer comprising
   (A) monomers A
   (B) at least one (meth)acrylate with olefinically unsaturated side groups (monomers B), and
   (C) at least one photoinitiator comprising 4-methylbenzophenone and 2,4,6,-trimethylbenzophenone.

2. The aqueous emulsion polymer according to claim 1, wherein the glass transition temperature is ≤60° C.

3. The aqueous emulsion polymer according to claim 1, wherein the glass transition temperature is ≥−50° C. and ≤30° C.

4. The aqueous emulsion polymer according to claim 1, wherein the glass transition temperature is ≥−50° C. and ≤10° C.

5. The aqueous emulsion polymer according to claim 1, wherein the glass transition temperature is ≥−40° C. and ≤0° C.

6. The aqueous emulsion polymer according to claim 1, wherein the monomers A are selected from the group consisting of α,β-ethylenically unsaturated monomers.

7. The aqueous emulsion polymer according to claim 1, wherein the monomers A are selected from the group consisting of esters of α,β-ethylenically unsaturated monocarboxylic and dicarboxylic acids with $C_1$-$C_{20}$ alkanols, vinylaromatics, esters of vinyl alcohol with $C_1$-$C_{30}$ monocarboxylic acids, ethylenically unsaturated nitriles, vinyl halides, vinylidene halides, monoethylenically unsaturated carboxylic and sulfonic acids, phosphorus-containing monomers, esters of α,β-ethylenically unsaturated monocarboxylic and dicarboxylic acids with $C_2$-$C_{30}$ alkanediols, amides of α,β-ethylenically unsaturated monocarboxylic and dicarboxylic acids of $C_2$-$C_{30}$ amino alcohols having a primary or secondary amino group, primary amides of α,β-ethylenically unsaturated monocarboxylic acids and the N-alkyl and N,N-dialkyl derivatives thereof, N-vinyllactams, open-chain N-vinylamide compounds, esters of allyl alcohol with $C_1$-$C_{30}$ monocarboxylic acids, esters of α,β-ethylenically unsaturated monocarboxylic and dicarboxylic acids with amino alcohols, amides of α,β-ethylenically unsaturated monocarboxylic and dicarboxylic acids with diamines having at least one primary or secondary amino group, N,N-diallylamines, N,N-diallyl-N-alkylamines, vinyl- and allyl-substituted nitrogen heterocycles, vinyl ethers, $C_2$-$C_8$ monoolefins, nonaromatic hydrocarbons having at least two conjugated double bonds, polyether (meth)acrylates, monomers containing urea groups, and/or mixtures thereof.

8. The aqueous emulsion polymer according to claim 1, wherein further to the monomers A the monomers B are used in amounts of 0.1% to 30% by weight and component C in amounts of 0.01% to 5% by weight, in each based on the sum of the monomers.

9. The aqueous emulsion polymer according to claim 1, wherein the monomers B have an iodine number in the range from 50 to 300 g iodine/100 g monomer.

10. A coating material comprising the polymer according to claim 1.

11. An exterior architectural paint comprising the polymer according to claim 1.

12. An elastic coating composition comprising the polymer according to claim 5.

13. An aqueous emulsion polymer comprising
   (A) monomers A
   (B) at least one (meth)acrylate with olefinically unsaturated side groups (monomers B), and
   (C) at least one photoinitiator comprising 4-methylbenzophenone and 2,4,6,-trimethylbenzophenone,
   wherein monomers (A), monomers (B), and the at least one photoinitiator (C) are copolymerized.

14. An aqueous emulsion polymer comprising
   (A) monomers A
   (B) at least one (meth)acrylate with olefinically unsaturated side groups (monomers B), and
   (C) at least one photoinitiator comprising 4-methylbenzophenone and 2,4,6,-trimethylbenzophenone,
   wherein monomers (A) and monomers (B) are copolymerized, and wherein the at least one photoinitiator has been added after polymerization.

15. The aqueous emulsion polymer of claim 1, obtained by a process that does not comprise UV crosslinking.

16. The aqueous emulsion polymer of claim 1, comprising crosslinking monomers.

\* \* \* \* \*